United States Patent
Treudt

(10) Patent No.: US 9,132,729 B2
(45) Date of Patent: Sep. 15, 2015

(54) PRESSURE EQUALIZING VALVE FOR A FUEL TANK OR SECONDARY FLUID TANK ON A MOTOR VEHICLE

(75) Inventor: Volker Treudt, Windeck (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 14/005,446

(22) PCT Filed: Feb. 9, 2012

(86) PCT No.: PCT/EP2012/000584
§ 371 (c)(1),
(2), (4) Date: Sep. 16, 2013

(87) PCT Pub. No.: WO2012/123055
PCT Pub. Date: Sep. 20, 2012

(65) Prior Publication Data
US 2014/0034147 A1   Feb. 6, 2014

(30) Foreign Application Priority Data
Mar. 14, 2011 (DE) .......................... 10 2011 013 959

(51) Int. Cl.
*B60K 15/035* (2006.01)
*F16K 17/36* (2006.01)
(52) U.S. Cl.
CPC ......... *B60K 15/03519* (2013.01); *F16K 17/366* (2013.01); *Y10T 137/0874* (2015.04); *Y10T 137/3099* (2015.04)
(58) Field of Classification Search
USPC ..................... 137/38, 43, 197, 583, 587, 589; 123/516
See application file for complete search history.

(56) References Cited

U.S. PATENT DOCUMENTS

| | | | |
|---|---|---|---|
| 4,261,477 A | 4/1981 | Casimir et al. | |
| 4,378,815 A | 4/1983 | Mochida et al. | |
| 5,042,519 A * | 8/1991 | Kerlin | 137/43 |
| 5,762,090 A | 6/1998 | Halamish et al. | |
| 6,047,686 A | 4/2000 | Bohringer et al. | |

(Continued)

FOREIGN PATENT DOCUMENTS

| | | |
|---|---|---|
| DE | 3116719 A1 | 11/1982 |
| DE | 69620193 T2 | 10/2002 |

(Continued)

OTHER PUBLICATIONS

PCT International Search Report and Written Opinion mailed Mar. 1, 2013, received in corresponding PCT Application No. PCT/EP2012/000584, 8 pgs.

(Continued)

*Primary Examiner* — John K Fristoe, Jr.
*Assistant Examiner* — R. K. Arundale
(74) *Attorney, Agent, or Firm* — Grossman Tucker Perreault & Pfleger, PLLC

(57) ABSTRACT

The invention relates to a pressure equalizing valve (5) for a fuel tank or secondary fluid tank on a motor vehicle, comprising at least one valve housing (10), at least one valve body movably arranged in the valve housing (10), at least one venting opening on the tank side and on the connection side or on the atmosphere side, which form a venting path (16) which may be opened or closed by the valve body depending on the position of the tank, when a predetermined transverse force is exceeded relative to a normal force which holds the valve body in a valve seat, the valve body being able to be lifted or deflected from the valve seat and thus opening the venting path (16) and when falling below said transverse force automatically adopting again the position closing the venting path (16). The valve body is configured as a ball (15) and arranged so that when pressure prevails on the tank side, said valve body is held in the valve seat.

21 Claims, 2 Drawing Sheets

(56) References Cited

U.S. PATENT DOCUMENTS

Figure 1:
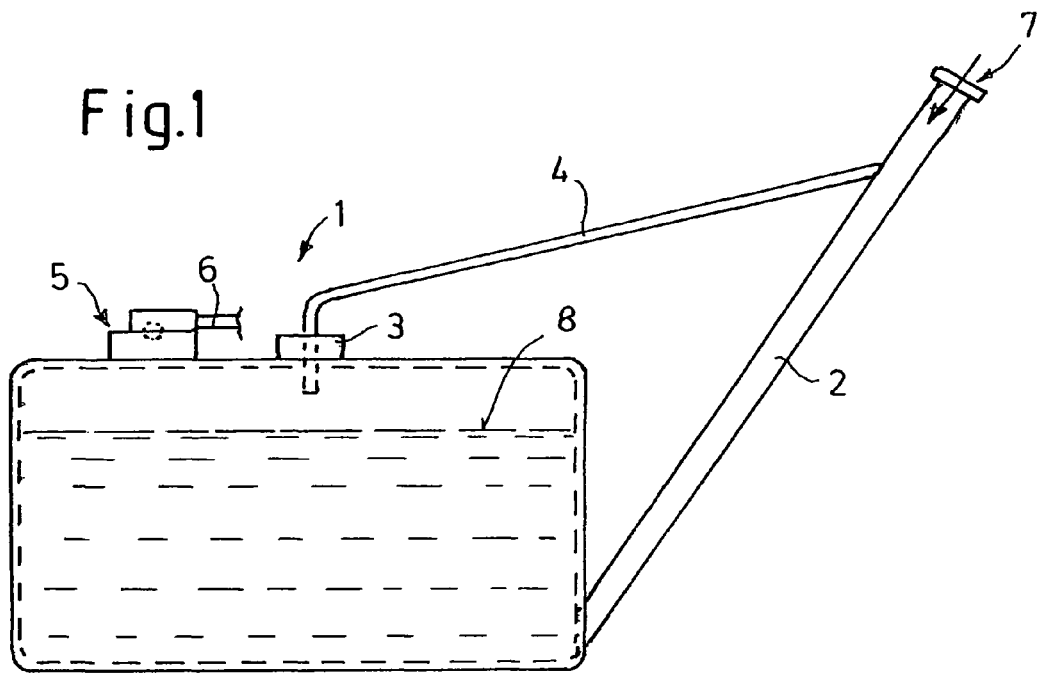

| | | | |
|---|---|---|---|
| 6,289,916 | B1 | 9/2001 | Romanek |
| 6,443,177 | B2 * | 9/2002 | Romanek ................. 137/202 |
| 6,530,364 | B1 | 3/2003 | Romanek |
| 6,601,601 | B2 | 8/2003 | Tamian |
| 7,152,638 | B2 | 12/2006 | Ganachaud |
| 8,171,952 | B2 | 5/2012 | Martin et al. |
| 2006/0254641 | A1 * | 11/2006 | Callahan et al. ............. 137/43 |
| 2007/0193561 | A1 * | 8/2007 | Benjey ..................... 123/518 |
| 2010/0236640 | A1 * | 9/2010 | Erdmann ................. 137/197 |
| 2010/0319789 | A1 | 12/2010 | Erdmann et al. |
| 2011/0005614 | A1 | 1/2011 | Pifer et al. |

FOREIGN PATENT DOCUMENTS

| | | | | |
|---|---|---|---|---|
| DE | 10027569 | B4 | 11/2004 | |
| DE | 202005001931 | U1 | 7/2005 | |
| FR | 2622667 | A1 | 5/1989 | |
| FR | 2625284 | A1 * | 6/1989 | ........... B60K 15/035 |
| JP | 62173552 | U | 11/1987 | |
| WO | 2006096892 | A1 | 9/2006 | |

OTHER PUBLICATIONS

English language translation of Korean Office Action/Grounds for Rejection issued Aug. 29, 2014, received in corresponding Korean Patent Application No. 2013-7024216, 1 pg.

English language translation of Japanese Office Action/Notice of Reasons for Rejection dated Aug. 6, 2014, received in corresponding Japanese Patent Application No. 2013-558312, 3 pgs.

English language Chinese Office Action/Search Report dated May 6, 2015, received in corresponding Chinese Application No. 201280009714.8, 4 pgs.

\* cited by examiner

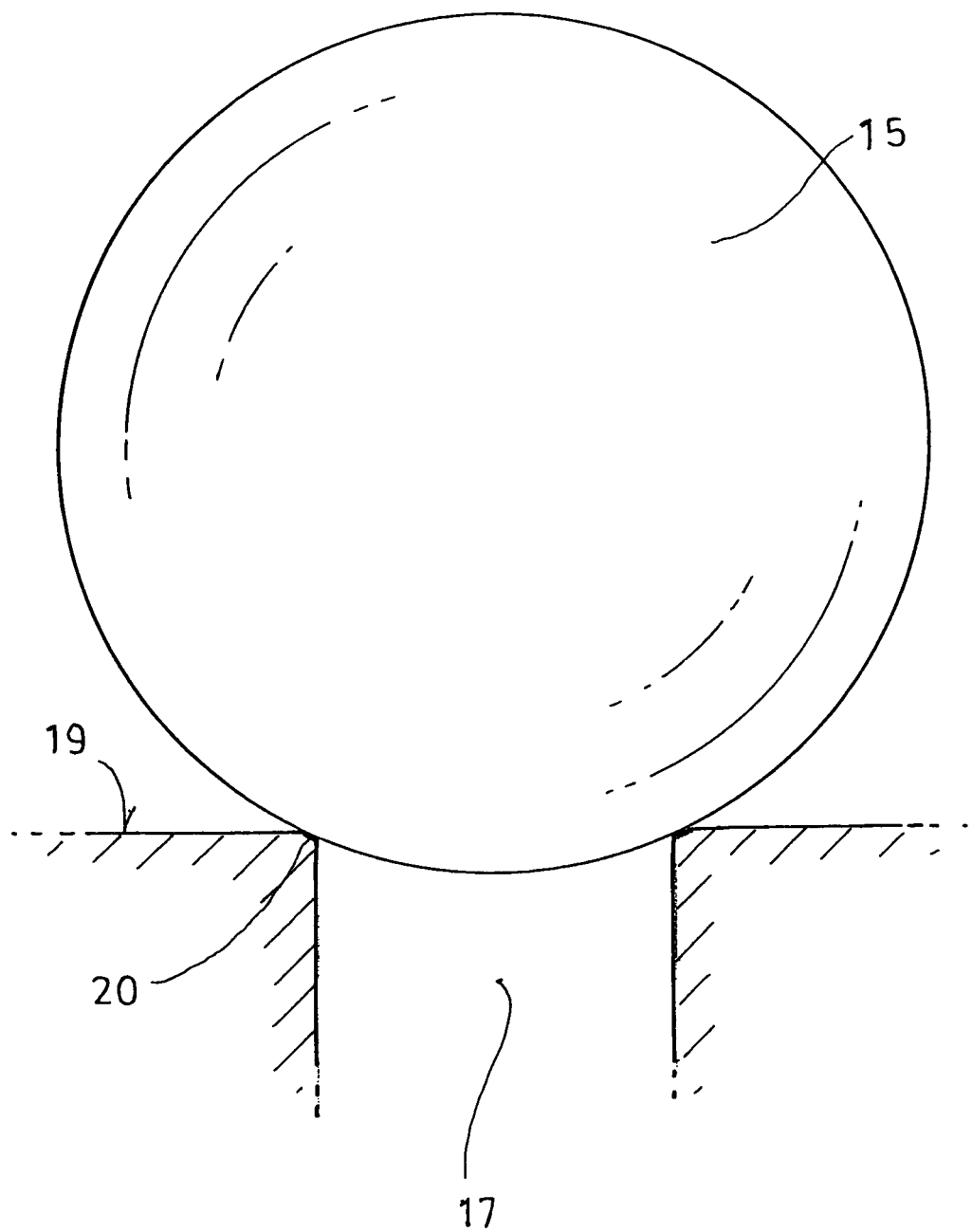

PRESSURE EQUALIZING VALVE FOR A FUEL TANK OR SECONDARY FLUID TANK ON A MOTOR VEHICLE

The invention relates to a pressure equalizing valve for a fuel tank or secondary fluid tank on a motor vehicle.

The invention further relates to a fuel tank or a secondary fluid tank for a motor vehicle, comprising at least one refuelling venting valve which may be actuated depending on the filling state and at least one operational venting valve.

Fuel tanks made of thermoplastic material, comprising means for delivering fuel to the internal combustion engine of the motor vehicle, comprising means for filling and comprising means for venting are considered as fuel tanks within the meaning of the present invention. Secondary fluid tanks within the meaning of the present invention are, for example, urea tanks for receiving a liquid reducing agent for selective catalytic exhaust-gas cleaning. Tanks for cleaning fluids, such as for example for washing fluid, tanks for oil or other service fluids are considered as secondary fluid tanks.

Provided the known tanks are not refuelled from containers, generally the refuelling takes place via dispensing nozzles which are able to be switched off depending on the filling state.

Such dispensing nozzles, as are used for example for refuelling fuel tanks or reducing agent tanks, are generally actuated via the fluid column rising in the filler pipe of the tank. This fluid column closes a blowhole on the dispensing nozzle which in turn causes the dispensing nozzle to be switched off. A rise in the fluid column in the filler pipe of the system to be refuelled is effected by the fluid rising in the tank actuating a refuelling venting valve which in turn closes a refuelling venting path of the tank so that the gas flow rate displaced through the fluid flowing-in is no longer able to escape from the tank, whereby the fluid column rises in the filler pipe.

Such refuelling venting valves may be configured, for example, as float valves. The fluid level rising in the tank raises a float which in turn closes the venting path. Alternatively, for example, a simple refuelling venting valve may be implemented via an immersion tube, the opening thereof being closed by the fluid level rising in the tank, so that the gas volume rising above the fluid level is no longer able to escape from the tank.

As, for example, in fuel tanks, a venting of the tank and/or a pressure equalization also has to be able to take place to a certain extent between the volume enclosed by the tank and the atmosphere, fuel tanks are generally provided with one or more so-called operational venting valves in addition to a refuelling venting valve, via which the gas present in the fuel tank during operation of the motor vehicle is able to be discharged to the atmosphere via at least one venting line and a fuel vapour filter.

As fuel expands, for example, in a temperature-dependent manner, and depending on the drive dynamics of the motor vehicle, more or less fuel passes from the liquid into the gas phase, a so-called equalization volume has to be kept free in any case above the fluid level in a fuel tank, said equalization volume not being allowed to be filled with fuel.

In order to ensure that the refuelling is switched off in a manner which is dependent on the filling state, therefore, operational venting valves provided on the fuel tank either have to be provided with a pressure-maintaining function or optionally have to be able to be switched. For example, it is known for the venting path to be able to be switched on the filler pipe of the motor vehicle by means of the filling nozzle inserted into the filler pipe and/or by means of the dispensing nozzle. When inserting the dispensing nozzle into the filler pipe, a switch is mechanically actuated thereby, which blocks the operational venting path and opens up a refuelling venting path.

Alternatively, it is possible to provide refuelling venting valves with spring-loaded valve bodies, which only open the operational venting path to an active carbon filter above a predefined excess pressure in the tank. Finally, it is possible to design individual refuelling venting valves to be able to be switched electromagnetically.

The above considerations also apply to refuelling secondary fluid tanks, for example for refilling/refuelling urea tanks which contain a liquid reducing agent in the form of an aqueous urea solution for catalytic denitrification of exhaust gas. If said tanks are not refuelled by means of containers in the gas displacement method, but by means of a dispensing nozzle, it is necessary here to switch off the dispensing nozzle in good time in order to prevent overfilling. For very different reasons, overfilling is not desirable. Above the fluid level, an equalization volume should remain free so that venting lines and optionally valves provided therein are not wetted with liquid urea. Moreover, an expansion of the urea in the liquid/solid phase transition as a result of frost should be possible. The urea tends to form large crystals during evaporation, the crystal formation possibly being able to block movable parts of the tank.

During operation of the motor vehicle, however, it is desirable if the pressure between the tank and the atmosphere is able to be equalized. This is also desirable, in particular, in fuel tanks made of thermoplastic.

The object of the invention, therefore, is to provide a pressure equalizing valve which permits an equalization of the pressure of the tank with the surroundings using the simplest possible means, overfilling protection being intended to be ensured in any case in the manner described above during refuelling of the tank.

The object of the invention is initially achieved by a pressure equalizing valve for a fuel tank or secondary fluid tank on a motor vehicle, comprising a valve housing, at least one valve body movably arranged in the valve housing, at least one venting opening on the tank side and on the connection side or on the atmosphere side, which form a venting path which may be opened or closed by the valve body depending on the position of the tank, when a predetermined transverse force is exceeded relative to a normal force which holds the valve body in a valve seat, the valve body being able to be lifted or deflected and thus opening the venting path and when falling below said transverse force automatically adopting again the position closing the venting path, and the valve body being arranged so that excess pressure on the tank side acts hydraulically on the valve body, such that said valve body is pressed into the valve seat.

By the design of the pressure equalizing valve according to the invention, in particular by the design of the pressure equalizing valve as a non-return valve, it is possible by relatively simple means to ensure overfilling protection. In this case, the gas pressure prevailing in the tank acts on the valve body in the position closing the venting path and prevents a venting of the equalization volume prevailing in the tank.

A pressure maintaining function, for example by means of a spring-loaded valve body, is entirely dispensed with within the meaning of the invention. The pressure equalizing valve according to the invention is able to be actuated exclusively by a transverse force acting at an angle to the normal force of the valve body, which may be applied either depending on the position or as a result of the drive dynamics. As a result, further movable parts such as springs or locking elements may be dispensed with. The pressure equalizing valve is thus able to be implemented in the simplest manner.

In the valve housing preferably only one venting path is provided, which in the resting position and horizontal position of the vehicle and/or of the tank in the installed position is closed by the valve body.

With a corresponding transverse inclination of the vehicle or of the tank or even when introducing transverse acceleration forces into the tank, the valve body is deflected from its position closing the venting path, so that optionally pressure equalization is briefly possible between the tank and the surroundings/atmosphere. The valve body then returns automatically into its position closing the venting path.

In a preferred variant of the pressure equalizing valve according to the invention, it is provided that the valve body is held in its sealing seat, actuated by gravity, and when exceeding a predetermined transverse inclination relative to a reference plane, preferably relative to a horizontal plane, in the installed position or when exceeding a predetermined transverse acceleration of the tank, is lifted or deflected from the valve seat.

In a particularly expedient variant of the pressure equalizing valve according to the invention, it is provided that the valve body is configured as a ball, which in the installed position closes an annular sealing seat extending approximately in a horizontal reference plane.

The pressure equalizing valve may, for example, comprise a plastics valve housing welded to the tank, the valve body being expediently configured as a freely movable steel ball arranged in the valve housing.

The pressure equalizing valve according to the invention is expediently configured so that, with an approximately horizontal alignment of the reference plane, the valve body adopts its position cooperating with the valve seat, exclusively actuated by weight force.

At an oblique angular position of approximately 4 to 7° relative to the horizontal, the valve body expediently still remains in its position closing the venting path.

In an advantageous variant of the pressure equalizing valve according to the invention, it is provided that a valve body chamber is provided within the valve housing, and within which a valve body is mounted in a freely movable manner.

The valve body chamber may comprise at least one inlet opening which is open on the tank side and one outlet opening which forms a valve seat for the valve body and which, when the reference plane is aligned approximately horizontally, is closed by the valve body.

In an advantageous variant of the pressure equalizing valve according to the invention, it is provided that the valve seat is configured in a lower level of the valve body chamber in the installed position.

The valve seat may, for example, be formed in a depression or recess in the bottom of the valve body chamber, in which the valve body rests when the vehicle is stationary, for example during the refuelling thereof, within the aforementioned oblique angular position.

The valve body does not necessarily have to be configured as a ball, instead it may have any shape/geometry which has at least partially conical sealing surfaces which cooperate with the valve seat in a suitable manner. The only geometric prerequisite for the mode of operation of the valve body is that said valve body may be deflected by a tilting movement/oblique position/transverse acceleration so that the parts of the valve body cooperating with the valve seat are briefly moved out of the valve seat.

Expediently, the valve seat is formed in a depression or recess of the bottom of the valve body chamber.

In a further expedient embodiment of the pressure equalizing valve according to the invention, it is provided that in the venting opening on the tank side at least one membrane or a porous closure body is provided which is only permeable to gases but not permeable to liquids. For example, a hydrophobized or oliophobized porous material may be provided as the membrane, for example also a porous sintered body. Expediently, this is, for example, a plastics material made of a polar or non-polar material according to whether the tank for receiving polar or non-polar fluids is provided. Such a membrane or such a closure body prevent the introduction of fluid into the valve housing.

In particular, it is expedient when the pressure equalizing valve according to the invention is provided as an overfilling protection valve for a urea tank, as urea could optionally crystalize in the valve housing, which is not desirable.

In principle, however, it is also possible to provide such a membrane or such a porous closure body in the venting opening on the tank side of a pressure equalizing valve for a fuel tank. In this case, an oliophobized plastics material is used as a membrane or closure body.

The object of the invention is further achieved by a fuel tank or a secondary fluid tank for a motor vehicle comprising at least one refuelling venting valve which may be actuated depending on the filling state and at least one operational venting valve, the fuel tank according to the invention being characterized in that the operational venting valve is configured as an overfilling protection valve, which opens or closes at least one venting opening on the atmosphere side depending on the position of the tank.

The fuel tank according to the invention may be configured with an overfilling protection valve which comprises at least one of the above-described features of the above-described pressure equalizing valve or a plurality of these features in any combination.

Figure 2:
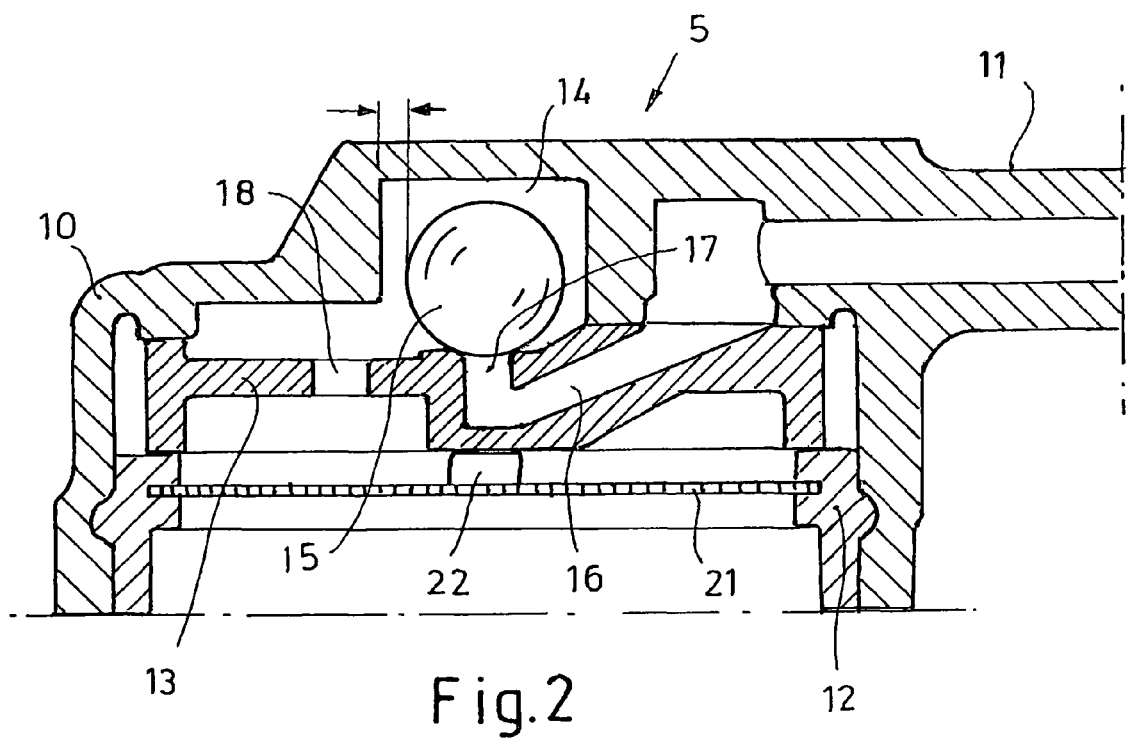

The invention is described hereinafter with reference to an exemplary embodiment shown in the drawings, in which:

FIG. 1: shows a schematic view of a secondary fluid tank as a urea tank according to the invention, in a very simplified view, FIG. 2: shows a sectional view through a pressure equalizing valve according to the invention and FIG. 3: shows an enlarged view of the valve body of the pressure equalizing valve according to the invention.

The urea tank 1 shown in FIG. 1 comprises a filler pipe 2, a refuelling venting device 3 as well as a refuelling venting line 4 which, for example, is guided via the end of the filler pipe 2 on the opening side, to a fuel vapour filter, not shown.

The urea tank 1 further comprises a pressure equalizing valve 5 which is also connected via an operational venting line 6 to the fuel vapour filter, not shown.

The urea tank 1 may, for example, be formed from thermoplastic material. Said urea tank may be obtained by extrusion blow-moulding of a single-layer or multi-layer extrudate (co-extrudate) based on HDPE (High Density Polyethylene).

As described above, the invention is explained with reference to the urea tank 1 shown by way of example. Instead of a urea tank, however, the pressure equalizing valve 5 according to the invention may be arranged on any secondary fluid tank as well as on a fuel tank.

The filling of the urea tank 1 takes place conventionally via the filler pipe 2, by means of a filling nozzle and/or dispensing nozzle, not shown, which is inserted into the opening 7 of the filler pipe 2. During refuelling, the fluid level 8 rises inside the urea tank 1 until said fluid level, for example, reaches and closes the end of the refuelling venting line 4 protruding into the urea tank 1 (immersion tube switch-off). Further venting of the urea tank 1 is thus no longer able to take place via the refuelling venting line 4. Accordingly, the fluid entering through the filler pipe 2 into the urea tank 1 may no longer displace the gas volume prevailing thereabove, which causes a rise in pressure inside the urea tank 1 and a rise of the fluid column in the filler pipe 2, until the fluid column in the filler pipe 2 reaches the dispensing nozzle and causes the filling process to be halted.

In order to produce an equalization of the pressure between the equalization volume 9 remaining above the fluid level 8 and the atmosphere when the motor vehicle is driven, the urea tank 1 being fitted in said motor vehicle, operational venting is provided via the pressure equalizing valve 5 and the operational venting line 6.

FIG. 2 shows a section through the pressure equalizing valve 5 which is shown in the closed position in which operational venting is not possible.

Said switching state shown in FIG. 2 of the pressure equalizing valve 5 is the state in which the motor vehicle is at rest in an approximately horizontal position.

The horizontal plane as the normal position of the motor vehicle and the tank during refuelling is hereinafter denoted as the reference plane.

The pressure equalizing valve 5 comprises a valve housing 10 made of a thermoplastic material which is preferably compatible with the plastics material of the fuel tank in the sense of being able to be welded. The valve housing 10 is open on the tank side and on its side remote from the urea tank 1 is provided with a nipple 11 for receiving the operational venting line 6.

The nipple 11 is provided with a fir-tree profile, not shown, for throttling the operational venting line 6. The operational venting line 6 may, however, also be connected integrally to the valve housing 10.

In the exemplary embodiment shown, the valve housing 10 is welded at its venting opening on the tank side, for example to the urea tank 1. A membrane carrier is denoted by 12, which is snapped or welded into the opening of the urea tank 1. Alternatively, it is possible for the membrane carrier 12 to have been bonded into the valve housing 10.

The valve housing 10 is of a substantially two-part configuration, a ball carrier 13 being welded into said housing and with the valve housing 10 forming a valve body chamber 14. The valve body chamber 14 receives as the valve body a ball 15 which in the exemplary embodiment shown in FIG. 2 closes a labyrinth-type venting path 16 formed between the valve housing 10 and the ball carrier 13. Said venting path configured as a venting channel forms a circular venting bore 17 forming the valve body chamber 14, said venting bore forming an annular valve seat for the ball 15 as the valve body.

The valve body chamber 14 communicates with the volume of the urea tank 1 via an inlet opening 18 which extends in spatial terms parallel to the venting bore 17. Hydraulically, i.e. in the sense of a hydraulic circuit diagram, the inlet opening 18 extends in series with the venting bore 17.

The venting bore 17 is arranged approximately centrally in a bottom depression 19 of the valve housing chamber 14.

An enlarged partial view of the bottom depression 19 and of the ball 15 is shown in FIG. 3.

The bottom depression 19 has a conicity (concavity) with an angle of approximately 5° to 15° relative to the reference plane.

As may be derived from the view of FIG. 3, in the bottom depression 19 a circular peripheral valve seat surface 20 is provided which forms the periphery of the venting bore 17 and within which the ball 15 comes to bear in a linear manner. Such a linear abutment is desirable, in particular, in order to effect a relatively high surface pressure for the purpose of minimizing any leakages.

The bottom depression 19, the valve seat surface 20 and the size of the ball 15 are dimensioned so that a transverse incline of markedly more than 4° (tolerance of between 4° and 7°) effects a deflection of the ball 15 from the resting position shown in FIG. 3, until the ball 15 bears against one of the surrounding walls of the valve body chamber 14, in this position the venting bore 17 and thus the venting path 16 being opened. When compensating for the transverse inclination, the ball 15 automatically rolls back into the initial position shown in the figures. The clear width of the valve body chamber 14 is markedly greater than the diameter of the ball 15.

A pressure equalization between the urea tank and the surroundings may be produced via the inlet opening 18 and the operational venting line 16.

If the valve body and/or the ball 15 is located in the normal position shown in FIGS. 2 and 3, the internal pressure of the tank acts via the inlet opening 18 on the ball 15 and holds said ball in the valve seat surface 20. The ball acts in the manner of a non-return element which keeps the venting path 16 closed.

A gas-permeable membrane is denoted by 21, which extends in the opening of the valve housing 10 on the tank side and/or in the tank opening itself. The membrane 21 consists, for example, of a hydrophobic, porous plastics material which is impermeable to non-polar fluids but permits gases to pass through. The membrane 21 is supported by means of a cruciform supporting structure 22, only partially shown, against the ball carrier 13 to prevent being deflected too much in the event of pressure on the inside of the tank.

LIST OF REFERENCE NUMERALS

1 Urea tank
2 Filler pipe
3 Refuelling venting device
4 Refuelling venting line
5 Pressure equalizing valve
6 Operational venting line
7 Opening of the filler pipe
8 Fluid level
9 Equalization volume
10 Valve housing
11 Nipple
12 Membrane carrier
13 Ball carrier
14 Valve body chamber
15 Ball
16 Venting path
17 Venting bore
18 Inlet opening
19 Bottom depression
20 Valve seat surface
21 Membrane
22 Cruciform supporting structure

What is claimed is:
1. A pressure equalizing valve for a fuel tank or secondary fluid tank on a motor vehicle, comprising:
at least one valve housing,
at least one valve body movably arranged in the valve housing,
at least one venting opening on a tank side,
wherein the at least one valve housing, the at least one valve body and the at least one venting opening form a venting path openable or closeable by the valve body such that, when a predetermined transverse force is exceeded relative to a normal force which holds the valve body in a valve seat, the valve body is liftable or deflectable from the valve seat to open the venting path and, when falling below said transverse force, the valve body is automatically positionable in the valve seat to close the venting path, wherein the valve body is arranged so that excess pressure on the tank side acts hydraulically on the valve body, such that said valve body is pressed onto the valve seat, and wherein in the valve housing only one venting path is provided, which in a resting position and a horizontal position of the vehicle and/or of the tank in an installed position, is closed by the valve body.

2. The pressure equalizing valve according to claim 1, wherein the valve body is held in the valve seat, actuated by gravity, and when exceeding a predetermined transverse inclination relative to a horizontal reference plane, in the installed position or when exceeding a predetermined transverse acceleration of the tank, is lifted or deflected from the valve seat.

3. The pressure equalizing valve according to claim 1, wherein the valve body is configured as a ball, which in the installed position, closes against the valve seat, wherein the valve seat is configured as an annular sealing seat.

4. The pressure equalizing valve according to claim 1, wherein, in a horizontal reference plane, the valve body adopts a position cooperating with the valve seat, exclusively actuated by weight force.

5. The pressure equalizing valve according to claim 1, wherein a valve body chamber is provided within the valve housing, and within which the valve body is mounted in a freely movable manner.

6. The pressure equalizing valve according to claim 5, wherein the valve body chamber comprises at least one inlet opening which is open on the tank side and one outlet opening which forms the valve seat for the valve body and which, when aligned in a horizontal reference plane, is closed by the valve body.

7. The pressure equalizing valve according to claim 5, wherein the valve seat is configured in a lower level of the valve body chamber in the installed position.

8. The pressure equalizing valve according to claim 7, wherein the valve seat is formed in a depression or recess in a bottom of the valve body chamber.

9. The pressure equalizing valve according to claim 1, wherein in the venting opening on the tank side at least one membrane or a porous closure body is provided and which is only permeable to gases.

10. The pressure equalizing valve according to claim 1, wherein the tank side having the at least one venting opening is a connection side of the tank.

11. The pressure equalizing valve according to claim 1, wherein the tank side having the at least one venting opening is an atmosphere side of the tank.

12. A fuel tank or secondary fluid tank for a motor vehicle comprising: at least one refuelling venting valve actuatable depending on a filling state of the tank, at least one operational venting valve comprising at least one valve housing, and at least one valve body movably arranged in the valve housing, wherein the operational venting valve is configured as an overfilling protection valve, which opens or closes at least one venting opening on an atmosphere side during driving operation of the motor vehicle, depending on a position of the valve body, wherein the valve body is arranged so that excess pressure on a tank side acts hydraulically on the valve body, such that said valve body is pressed onto a valve seat, wherein in the valve housing only one venting path is provided, and wherein valve body opens the venting path in a first position of the valve body and closes that venting path in a second position of the valve body which is different from the first position of the valve body.

13. The fuel tank according to claim 12, wherein the operational venting valve is further configured as a pressure equalizing valve, and wherein the operational venting valve further comprises at least one venting opening on the tank side, wherein the at least one valve housing, the at least one valve body and the at least one venting opening form the venting path openable or closeable by the valve body such that, when a predetermined transverse force is exceeded relative to a normal force which holds the valve body in the valve seat, the valve body is liftable or deflectable from the valve seat to open the venting path and, when falling below said transverse force, the valve body is automatically positionable in the valve seat to close the venting path, and wherein in the valve housing only one venting path is provided, which in a resting position and a horizontal position of the vehicle and/or of the tank in the installed position, is closed by the valve body.

14. The fuel tank according to claim 10, wherein the valve body is held in the valve seat, actuated by gravity, and when exceeding a predetermined transverse inclination relative to a horizontal reference plane, in an installed position or when exceeding a predetermined transverse acceleration of the tank, is lifted or deflected from the valve seat.

15. The fuel tank according to claim 10, wherein the valve body is configured as a ball, which in an installed position, closes against the valve seat, wherein the valve seat is configured as an annular sealing seat.

16. The fuel tank according to claim 10, wherein, in a horizontal reference plane, the valve body adopts a position cooperating with the valve seat, exclusively actuated by weight force.

17. The fuel tank according to claim 10, wherein a valve body chamber is provided within the valve housing, and within which the valve body is mounted in a freely movable manner.

18. The fuel tank according to claim 17, wherein the valve body chamber comprises at least one inlet opening which is open on a tank side and one outlet opening which forms the valve seat for the valve body and which, when aligned in a_horizontal reference plane, is closed by the valve body.

19. The fuel tank according to claim 17, wherein the valve seat is configured in a lower level of the valve body chamber in an installed position.

20. The fuel tank according to claim 19, wherein the valve seat is formed in a depression or recess in a bottom of the valve body chamber.

21. The fuel tank according to claim 10, wherein in a venting opening on the tank side at least one membrane or a porous closure body is provided and which is only permeable to gases.

* * * * *